(12) United States Patent
Shintani et al.

(10) Patent No.: US 8,999,599 B2
(45) Date of Patent: Apr. 7, 2015

(54) METHOD OF FABRICATING MEMBRANE ELECTRODE ASSEMBLY AND GAS DIFFUSION LAYER

(75) Inventors: Haruhiko Shintani, Osaka (JP); Toshifumi Ueda, Osaka (JP); Masaki Yamauchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/812,233

(22) PCT Filed: Jul. 17, 2012

(86) PCT No.: PCT/JP2012/004562
§ 371 (c)(1),
(2), (4) Date: Jan. 25, 2013

(87) PCT Pub. No.: WO2013/011683
PCT Pub. Date: Jan. 24, 2013

(65) Prior Publication Data
US 2013/0122394 A1 May 16, 2013

(30) Foreign Application Priority Data
Jul. 19, 2011 (JP) .................... 2011-157975

(51) Int. Cl.
*H01M 8/10* (2006.01)
*H01M 4/88* (2006.01)
(52) U.S. Cl.
CPC .............. *H01M 8/1004* (2013.01); *H01M 4/88* (2013.01); *Y02E 60/521* (2013.01); *H01M 4/8807* (2013.01); *H01M 2008/1095* (2013.01)
(58) Field of Classification Search
None
See application file for complete search history.

(56) References Cited

U.S. PATENT DOCUMENTS

| | | | | |
|---|---|---|---|---|
| 6,383,556 | B2 * | 5/2002 | Lott et al. ................. | 427/115 |
| 2004/0009389 | A1 * | 1/2004 | Sakai et al. ................ | 429/42 |

(Continued)

FOREIGN PATENT DOCUMENTS

| | | |
|---|---|---|
| CA | 2 771 421 A1 | 3/2011 |
| JP | 2001-085280 A | 3/2001 |

(Continued)

OTHER PUBLICATIONS

International Search Report issued in International Patent Application No. PCT/JP2012/004562 dated Sep. 18, 2012.

(Continued)

*Primary Examiner* — Patrick Ryan
*Assistant Examiner* — Jose Colucci Rios
(74) *Attorney, Agent, or Firm* — McDermott Will & Emery LLP (57) ABSTRACT

A method of fabricating a membrane electrode assembly, comprising: obtaining a mixture by mixing and kneading electrically conductive particles, a polymer resin, a surfactant, and a dispersion solvent (S1); obtaining a sheet-like mixture by rolling out and shaping the mixture (S2); obtaining a carbon sheet by heat-treating the sheet-like mixture at a first heat treatment temperature such that the surfactant and the dispersion solvent are removed from the sheet-like mixture (S3); obtaining a dispersion liquid by mixing electrically conductive particles, a polymer resin, a surfactant, and a dispersion solvent (S4); forming, on the carbon sheet, a dispersion liquid layer thinner than the carbon sheet by forming and drying a coating of the dispersion liquid on the carbon sheet (S5); obtaining a gas diffusion layer in which a carbon layer is formed on the carbon sheet, by heat-treating the carbon sheet on which the dispersion liquid layer is formed at a second heat treatment temperature lower than the first heat treatment temperature such that the surfactant and the dispersion solvent are removed from the dispersion liquid layer (S6); and stacking a catalyst layer and an electrolyte membrane in said order on the carbon layer (S7).

19 Claims, 4 Drawing Sheets

(56) References Cited

U.S. PATENT DOCUMENTS

| | | |
|---|---|---|
| 2004/0038808 A1* | 2/2004 | Hampden-Smith et al. .. 502/180 |
| 2008/0311462 A1* | 12/2008 | Yamauchi et al. ............. 429/41 |
| 2008/0311463 A1 | 12/2008 | Park et al. |
| 2009/0068525 A1* | 3/2009 | Iisaka ........................... 429/30 |
| 2009/0197137 A1* | 8/2009 | Lee et al. ....................... 429/33 |
| 2010/0136457 A1 | 6/2010 | Yamada |
| 2010/0167099 A1* | 7/2010 | Sung et al. ................... 429/30 |
| 2011/0014543 A1* | 1/2011 | Taniguchi ................... 429/483 |
| 2011/0076592 A1 | 3/2011 | Yamauchi et al. |
| 2011/0207025 A1 | 8/2011 | Yamauchi et al. |

FOREIGN PATENT DOCUMENTS

| | | |
|---|---|---|
| JP | 2003-178763 A | 6/2003 |
| JP | 2004-164903 A | 6/2004 |
| JP | 2007-242378 A | 9/2007 |
| JP | 2008-276949 A | 11/2008 |
| JP | 2009-016171 A | 1/2009 |
| JP | 2010-176948 A | 8/2010 |
| JP | 2011-258395 A | 12/2011 |
| WO | 2007/089119 A1 | 8/2007 |

OTHER PUBLICATIONS

English translation of Japanese Notice of Reasons for Rejection issued in Japanese Patent Application No. JP 2012-548279 on Jan. 8, 2013; 4 pages.

Extended European Search Report issued in European Application No. 12815214.7-1360 dated Nov. 5, 2014.

* cited by examiner

METHOD OF FABRICATING MEMBRANE ELECTRODE ASSEMBLY AND GAS DIFFUSION LAYER

RELATED APPLICATIONS

This application is the U.S. National Phase under 35 U.S.C. §371 of International Application No. PCT/JP2012/004562, filed on Jul. 17, 2012, which in turn claims the benefit of Japanese Application No. 2011-157975, filed on Jul. 19, 2011, the disclosures of which Applications are incorporated by reference herein.

TECHNICAL FIELD

The present invention relates to a method of fabricating a membrane electrode assembly and a gas diffusion layer. More particularly, the present invention relates to a method of fabricating a membrane electrode assembly and a gas diffusion layer for use in a fuel cell.

BACKGROUND ART

A fuel cell such as a polymer electrolyte fuel cell is a device configured to generate electric power and heat at the same time by causing a fuel gas containing hydrogen and an oxidizing gas containing oxygen such as air to electrochemically react with each other at a gas diffusion layer that includes a catalyst layer of, for example, platinum.

Generally speaking, the structure of a polymer electrolyte fuel cell is such that an electrode layer and a gas diffusion layer are stacked in said order at both sides of a polymer electrolyte membrane. Types of the gas diffusion layer include one in which carbon fibers are used as a base material of the gas diffusion layer and one in which carbon fibers are not used as a base material of the gas diffusion layer. Patent Literatures 1 and 2 both disclose a gas diffusion layer, in which carbon fibers are not used as a base material of the gas diffusion layer.

Patent Literature 1 discloses a sheet-like electrode fabrication method where a rod-like preform that is formed of carbon fine powder, a fluorine-containing polymer resin, and a liquid lubricant is rolled out.

Patent Literature 2 discloses a gas diffusion layer for use in a fuel cell, which is formed from a porous member whose main components are electrically conductive particles such as acetylene black or graphite and a polymer resin such as PTFE.

CITATION LIST

Patent Literature

PTL 1: Japanese Laid-Open Patent Application Publication No. 2001-85280
PTL 2: International Publication No. WO 2010/050219

SUMMARY OF INVENTION

Technical Problem

However, the above-described conventional gas diffusion layers have a problem that the handling of membrane electrode assemblies fabricated by using these diffusion layers is not sufficiently easy.

The present invention has been made in view of the above conventional problem, and an object of the present invention is to provide a membrane electrode assembly for use in a fuel cell, which is easy to handle, and to provide a gas diffusion layer for obtaining the membrane electrode assembly.

Solution to Problem

In order to solve the above-described problem, the inventors of the present invention conducted diligent studies, and as a result, obtained the findings described below.

In the case of fabricating a gas diffusion layer in which carbon fibers or the like are not used as a base material (i.e., a base material-less GDL), it is essential to use a surfactant in order to disperse electrically conductive particles and a polymer resin in a solvent. The surfactant may poison an electrocatalyst in the fuel cell. For this reason, in the case of fabricating a gas diffusion layer by using electrically conductive particles, a polymer resin, a surfactant, and a dispersion solvent, it is necessary to perform high-temperature heat treatment in order to remove the surfactant. In this respect, the following problems have been found: when the gas diffusion layer is subjected to such high-temperature heat treatment, the adhesiveness of the gas diffusion layer decreases; and consequently, bonding of the gas diffusion layer to a catalyst layer becomes difficult, which results in a difficulty in handling of a membrane electrode assembly. It is considered that the decrease in the adhesiveness is caused due to progress of crystallization of the polymer resin.

In view of the above, the inventors of the present invention have arrived at the following idea: obtain a dispersion liquid by mixing electrically conductive particles, a polymer resin, a surfactant, and a dispersion solvent; form a coating of the dispersion liquid on a sheet that has been subjected to high-temperature heat treatment; and heat-treat the sheet at a low temperature. This method makes it possible to secure the adhesiveness of the gas diffusion layer, and to obtain a membrane electrode assembly that is easy to handle.

Specifically, in order to solve the above problems, a method of fabricating a membrane electrode assembly according to the present invention includes: obtaining a mixture by mixing and kneading electrically conductive particles, a polymer resin, a surfactant, and a dispersion solvent; obtaining a sheet-like mixture by rolling out and shaping the mixture; obtaining a carbon sheet by heat-treating the sheet-like mixture at a first heat treatment temperature such that the surfactant and the dispersion solvent are removed from the sheet-like mixture; obtaining a dispersion liquid by mixing electrically conductive particles, a polymer resin, a surfactant, and a dispersion solvent; forming, on the carbon sheet, a dispersion liquid layer thinner than the carbon sheet by forming and drying a coating of the dispersion liquid on the carbon sheet; obtaining a gas diffusion layer in which a carbon layer is formed on the carbon sheet, by heat-treating the carbon sheet on which the dispersion liquid layer is formed at a second heat treatment temperature lower than the first heat treatment temperature such that the surfactant and the dispersion solvent are removed from the dispersion liquid layer; and stacking a catalyst layer and an electrolyte membrane in said order on the carbon layer.

According to the above, a membrane electrode assembly that is easy to handle is obtained.

In the above method of fabricating a membrane electrode assembly, the dispersion liquid layer may be formed by spray coating.

According to the above, infiltration of the dispersion liquid into the carbon sheet can be suppressed.

The above method of fabricating a membrane electrode assembly may include: bringing a stack structure, which is a stack of the electrolyte membrane and the catalyst layer, into contact with the gas diffusion layer such that the carbon layer and the catalyst layer come into contact with each other; and performing thermocompression bonding at a third heat treatment temperature lower than the second heat treatment temperature.

According to the above, crystallization of the polymer resin in the carbon layer at the time of performing the thermocompression bonding can be suppressed, and thereby decrease in the adhesiveness of the carbon layer due to the thermocompression bonding can be suppressed.

In the above method of fabricating a membrane electrode assembly, the surfactant that serves as a raw material of the dispersion liquid may be a non-ionic surfactant.

According to the above, the surfactant can be removed more easily.

In the above method of fabricating a membrane electrode assembly, the heat treatment at the second heat treatment temperature may be performed in air.

According to the above, the surfactant can be removed more easily.

In the above method of fabricating a membrane electrode assembly, the carbon layer may have a thickness of not less than 10 μm and not more than 100 μm, and the second heat treatment temperature may be not lower than a decomposition temperature of the surfactant that serves as a raw material of the dispersion liquid, but lower than 260 degrees Celsius.

In the above method of fabricating a membrane electrode assembly, the carbon sheet may have a thickness of not less than 100 μm and not more than 1000 μm, and the first heat treatment temperature may be not lower than 260 degrees Celsius and not higher than a melting point of the polymer resin that serves as a raw material of the mixture.

In the above method of fabricating a membrane electrode assembly, a polymer resin content in the carbon layer may be higher than a polymer resin content in the carbon sheet.

A method of fabricating a gas diffusion layer according to the present invention includes: obtaining a mixture by mixing and kneading electrically conductive particles, a polymer resin, a surfactant, and a dispersion solvent; obtaining a sheet-like mixture by rolling out and shaping the mixture; obtaining a carbon sheet by heat-treating the sheet-like mixture at a first heat treatment temperature such that the surfactant and the dispersion solvent are removed from the sheet-like mixture; obtaining a dispersion liquid by mixing electrically conductive particles, a polymer resin, a surfactant, and a dispersion solvent; forming, on the carbon sheet, a dispersion liquid layer thinner than the carbon sheet by forming and drying a coating of the dispersion liquid on the carbon sheet; and obtaining a gas diffusion layer in which a carbon layer is formed on the carbon sheet, by heat-treating the carbon sheet on which the dispersion liquid layer is formed at a second heat treatment temperature lower than the first heat treatment temperature such that the surfactant and the dispersion solvent are removed from the dispersion liquid layer.

According to the above, a gas diffusion layer that can be used in an easy-to-handle membrane electrode assembly is obtained.

A membrane electrode assembly according to the present invention includes: a carbon sheet containing electrically conductive particles, a polymer resin, and a surfactant; a carbon layer provided on the carbon sheet and containing electrically conductive particles, a polymer resin, and a surfactant, such that a polymer resin content is higher in the carbon layer than in the carbon sheet; a catalyst layer provided to be in contact with the carbon layer; and an electrolyte membrane provided on the catalyst layer. In the membrane electrode assembly, a residual amount of surfactant in the carbon layer is 1 wt % or less, and an adhesion strength between the carbon layer and the catalyst layer is 0.1 N or greater per 25 mm×100 mm.

According to the above, a membrane electrode assembly that is easy to handle is provided.

Advantageous Effects of Invention

The fabrication method of the present invention provides a membrane electrode assembly that is easy to handle and a gas diffusion layer for obtaining the membrane electrode assembly.

DESCRIPTION OF EMBODIMENTS

Embodiment 1

Device Configuration

Figure 1:
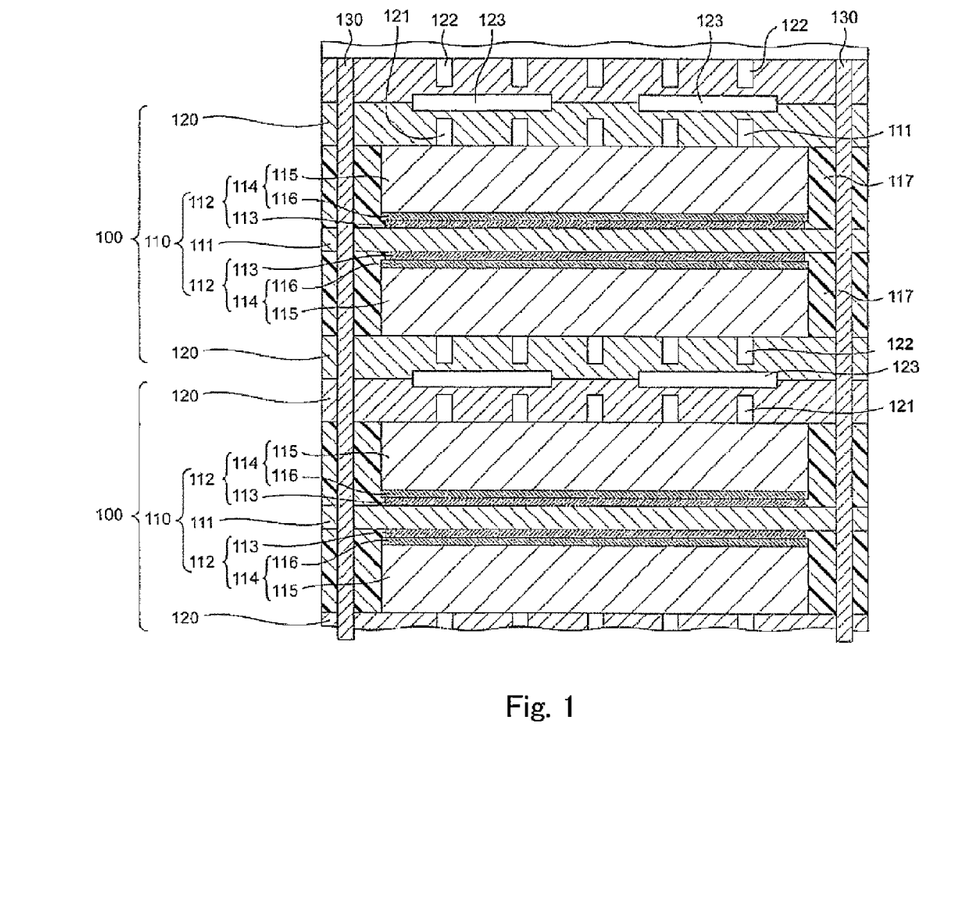
FIG. 1 is a cross-sectional view showing an example of a schematic configuration of a fuel cell stack in which a membrane electrode assembly obtained by a fabrication method according to Embodiment 1 is incorporated.

FIG. 1 is a cross-sectional view showing an example of a schematic configuration of a fuel cell stack in which a membrane electrode assembly obtained by a fabrication method according to Embodiment 1 is incorporated.

As shown in FIG. 1, a cell 100 (which may be referred to as a single-cell battery) according to the present embodiment, which is a polymer electrolyte fuel cell, includes an MEA 110 (Membrane-Electrode-Assembly) and a pair of plate-shaped electrically conductive separators 120 disposed on both respective surfaces of the MEA 110.

The MEA 110 includes: a polymer electrolyte membrane 111 (ion exchange resin membrane) which selectively transports hydrogen ions; and a pair of electrode layers 112 formed on both respective surfaces of the polymer electrolyte membrane 111. The pair of electrode layers 112 are formed on both respective surfaces of the polymer electrolyte membrane 111, and each electrode layer 112 includes: a catalyst layer 113 containing platinum metal catalyst-supporting carbon powder as a main component; and a gas diffusion layer 114 (which may be referred to as a GDL) formed on the catalyst layer 113 and having a current collecting function, gas permeability, and water repellency.

Preferably, the polymer electrolyte membrane 111 is a polymer membrane having hydrogen ion conductivity. Although the shape of the polymer electrolyte membrane 111 is not particularly limited, the shape of the polymer electrolyte membrane 111 may be substantially rectangular, for example. The material of the polymer electrolyte membrane 111 is not particularly limited, so long as the material selectively transports hydrogen ions.

Examples of the polymer electrolyte membrane 111 include fluorine-based polymer electrolyte membranes formed of perfluorocarbon sulfonic acid (e.g, Nafion (registered trademark) available from DuPont, USA; Aciplex (registered trademark) available from Asahi Kasei Corporation;

and Flemion (registered trademark) available from Asahi Glass Co., Ltd.) and various hydrocarbon-based electrolyte membranes.

Preferably, the catalyst layer 113 is a layer containing a catalyst catalyzing an oxidation-reduction reaction of hydrogen or oxygen. The catalyst layer 113 is not limited to a particular type of layer, so long as the catalyst layer 113 is electrically conductive and capable of catalyzing oxidation-reduction reactions of hydrogen and oxygen. Although the shape of the catalyst layer 113 is not particularly limited, the shape of the catalyst layer 113 may be substantially rectangular, for example.

For example, the catalyst layer 113 is formed from a porous member, the main components of which are: carbon powder supporting a platinum-group metal catalyst; and a polymer material having proton conductivity. The proton-conductive polymer material used for the catalyst layer 113 may be of the same kind as, or a different kind from, a proton-conductive polymer material used for the polymer electrolyte membrane.

Preferably, the gas diffusion layer 114 is an electrically conductive porous member. Although the shape of the gas diffusion layer 114 is not particularly limited, the gas diffusion layer 114 may be a rectangular plate-shaped member, for example. The gas diffusion layer 114 is not limited to a particular type of layer, so long as the gas diffusion layer 114 is electrically conductive and capable of dispersing reaction gas.

The gas diffusion layer 114 includes a carbon sheet 115 and a carbon layer 116. Each of the carbon sheet 115 and the carbon layer 116 includes electrically conductive particles and a polymer resin. The composition of the electrically conductive particles and the polymer resin in the carbon sheet 115 may be different from the composition of the electrically conductive particles and the polymer resin in the carbon layer 116. Preferably, the carbon layer 116 is thinner than the carbon sheet 115. The carbon layer 116 and the carbon sheet 115 are heat-treated layers, and preferably, the heat-treatment temperature of the carbon layer 116 is lower than the heat-treatment temperature of the carbon sheet 115. The gas diffusion layer 114 may contain not only the electrically conductive particles and the polymer resin but also a trace amount of, for example, a dispersion solvent and a surfactant used in the fabrication of the gas diffusion layer 114. The electrically conductive particles, the polymer resin, the dispersion solvent, and the surfactant will be described below in detail. It should be noted that the gas diffusion layer 114 may contain other materials (e.g., short carbon fibers) in addition to the electrically conductive particles, the polymer resin, the surfactant, and the dispersion solvent. Preferably, the polymer resin content in the carbon layer 116 is higher than the polymer resin content in the carbon sheet 115.

Reaction gas channel grooves may be formed in main surfaces of the gas diffusion layers 114, the main surfaces contacting the separators 120. The same gas diffusion layer may be used as the gas diffusion layer 114 at the cathode side and the gas diffusion layer 114 at the anode side, or the gas diffusion layer used as the gas diffusion layer 114 at the cathode side may be different from the gas diffusion layer used as the gas diffusion layer 114 at the anode side.

Preferably, the separators 120 serve to mechanically fix the MEA, and serially and electrically connect adjacent MEAs together. Preferably, the separators 120 are formed by using a carbon-containing material or a metal-containing material. The separators 120 may be electrically conductive porous plates.

In a case where the separators 120 are formed by using a carbon-containing material, the separators 120 can be formed in the following manner: raw material powder in which carbon powder and a resin binder are mixed is fed into a mold; and then pressure and heat are applied to the raw material powder fed into the mold.

In a case where the separators 120 are formed by using a metal-containing material, the separators 120 may be formed of metal plates. A titanium plate whose surface is gold-plated, or a stainless steel plate whose surface is gold-plated, may be used as the separators 120.

Fuel gas channel grooves 121 through which a fuel gas flows, and oxidizing gas channel grooves 122 through which an oxidizing gas flows, are provided at main surfaces of the pair of separators 120, the main surfaces being in contact with the gas diffusion layers 114 (hereinafter, referred to as electrode surfaces). In addition, cooling water channel grooves 123 through which cooling water or the like flows are provided at other main surfaces of the pair of separators 120, the other main surfaces not contacting the gas diffusion layers 114 (hereinafter, referred to as cooling surfaces). An electrochemical reaction occurs when the fuel gas and the oxidizing gas are supplied to the electrode layers 112 through the fuel gas channel grooves 121 and the oxidizing gas channel grooves 122, respectively. As a result, electric power and heat are generated.

If the reaction gas channel grooves are formed in the gas diffusion layers 114, it is not necessary for the fuel gas channel grooves 121 and the oxidizing gas channel grooves 122 to be formed in the separators 120.

In the present embodiment, two groups of manifold holes are formed in the peripheral portion of the separators 120. One group of manifold holes includes: two fuel gas manifold holes (not shown) through which the fuel gas is supplied or discharged; and one cooling fluid manifold hole (not shown) through which a cooling fluid is supplied or discharged. The other group of manifold holes includes: two oxidizing gas manifold holes (not shown) through which the oxidizing gas is supplied or discharged; and one cooling fluid manifold hole (not shown) through which the cooling fluid is supplied or discharged.

The pair of fuel gas manifold holes are used such that one of them is used for supplying the fuel gas and the other is used for discharging the fuel gas. The fuel gas channel grooves 121 are formed in the anode-side electrode surface of each separator 120 so as to connect these fuel gas manifold holes. The pair of oxidizing gas manifold holes are used such that one of them is used for supplying the oxidizing gas and the other is used for discharging the oxidizing gas. The oxidizing gas channel grooves 122 are formed in the cathode-side electrode surface of each separator 120 so as to connect these oxidizing gas manifold holes.

The pair of cooling fluid manifold holes are used such that one of them is used for supplying the cooling fluid and the other is used for discharging the cooling fluid. The cooling water channel grooves 123 are formed in the cooling surfaces of the separators 120 as necessary so as to connect these cooling fluid manifold holes.

Holes (not shown) corresponding to the six respective manifold holes of the separators 120 are formed in the polymer electrolyte membrane 111 of the membrane electrode assembly 110. These holes are connected to form six manifolds (internal manifolds). Among these six manifolds, a fuel gas supply manifold is supplied with the fuel gas; the fuel gas is discharged from a fuel gas discharge manifold; an oxidizing gas supply manifold is supplied with the oxidizing gas; the oxidizing gas is discharged from an oxidizing gas discharge manifold; a cooling fluid supply manifold is supplied with the cooling fluid; and the cooling fluid is discharged from a cooling fluid discharge manifold. The six manifold holes may be arranged in any manner.

The above description has been given by taking as an example an internal manifold type, which is configured such that the manifolds for supplying the fuel gas, oxidizing gas, and cooling water are formed when the separators 120 provided with the manifold holes for the fuel gas, oxidizing gas, and cooling water are stacked. However, the present embodiment is similarly applicable to a so-called external manifold type, in which the manifolds for supplying the fuel gas, oxidizing gas, and cooling water are provided at the side faces of the stack. With such application, the same advantageous effects can be obtained.

Alternatively, in the above-described configuration according to the present embodiment, each separator 120 may be formed from a porous electrically conductive material, and the pressure of the cooling water flowing through the cooling water channel grooves 123 may be made higher than the pressure of reaction gas flowing through at least one of the fuel gas channel grooves 121 and the oxidizing gas channel grooves 122 so as to cause part of the cooling water to pass through the separator 120 to the electrode surface side, so that the polymer electrolyte membrane 111 is humidified. That is, a so-called internally-humidified type may be adopted.

Generally speaking, the cell 100 is used in such a manner that more than one cells 100 are stacked as shown in FIG. 1 and adjacent cells 100 are electrically and serially connected. It should be noted that the stacked cells 100 are fastened together by fastening members 130 such as bolts with predetermined fastening pressure for the purpose of preventing leakage of the fuel gas and the oxidizing gas and reducing contact resistance. Accordingly, the MEA 110 and the separators 120 are in surface contact with each other with predetermined pressure. Moreover, in order to prevent the gases necessary for the electrochemical reaction from leaking to the outside, gaskets 117 (sealing materials) are disposed between the separators 120 so as to cover the side faces of the catalyst layer 113 and the gas diffusion layer 114.

Preferably, each gasket 117 fills the gaps among the catalyst layer 113, the polymer electrolyte membrane 111, and the separator 120, or fills the gaps between the catalyst layer 113 and the separator 120. The gasket is preferably a synthetic resin having moderate mechanical strength and flexibility. Although the shape of the gasket 117 is not particularly limited, the gasket 117 may be in a substantially rectangular annular shape, for example.

More preferably, for example, the material forming the gasket 117 is a synthetic resin made from at least one resin selected from the group consisting of polyethylene naphthalate, polytetrafluoroethylene, polyethylene terephthalate, fluoroethylene-propylene copolymer, tetrafluoroethylene-perfluoroalkoxyethylene copolymer, polyethylene, polypropylene, polyetheramide, polyetherimide, polyetheretherketone, polyethersulfone, polyphenylene sulfide, polyarylates, polysulfides, polyimides, and polyimide-amides.

For example, a compound such as a rubber material, a thermoplastic elastomer, or an adhesive can be used as a material forming the gasket 117. Specific examples of a sealing material forming the gasket 117 include fluorine rubber, silicone rubber, natural rubber, EPDM, butyl rubber, butyl chloride rubber, butyl bromide rubber, butadiene rubber, styrene-butadiene copolymer, ethylene-vinyl acetate rubber, acrylic rubber, polyisopropylene polymer, perfluorocarbon, thermoplastic elastomers such as polystyrene-based, polyolefin-based, polyester-based, and polyamide-based thermoplastic elastomers, adhesives using latex such as one using isoprene rubber latex and one using butadiene rubber latex, and other adhesives such as one using liquid polybutadiene, one using liquid polyisoprene, one using liquid polychloroprene, one using liquid silicone rubber, one using liquid fluorine rubber, and one using liquid acrylonitrile-butadiene rubber. However, the sealing material forming the gasket 117 is not limited to these compounds. Any one of these compounds alone, or a mixture or complex of two or more kinds of these compounds, may be used as a sealing material forming the gasket 117.

Fabrication Method

Figure 2:
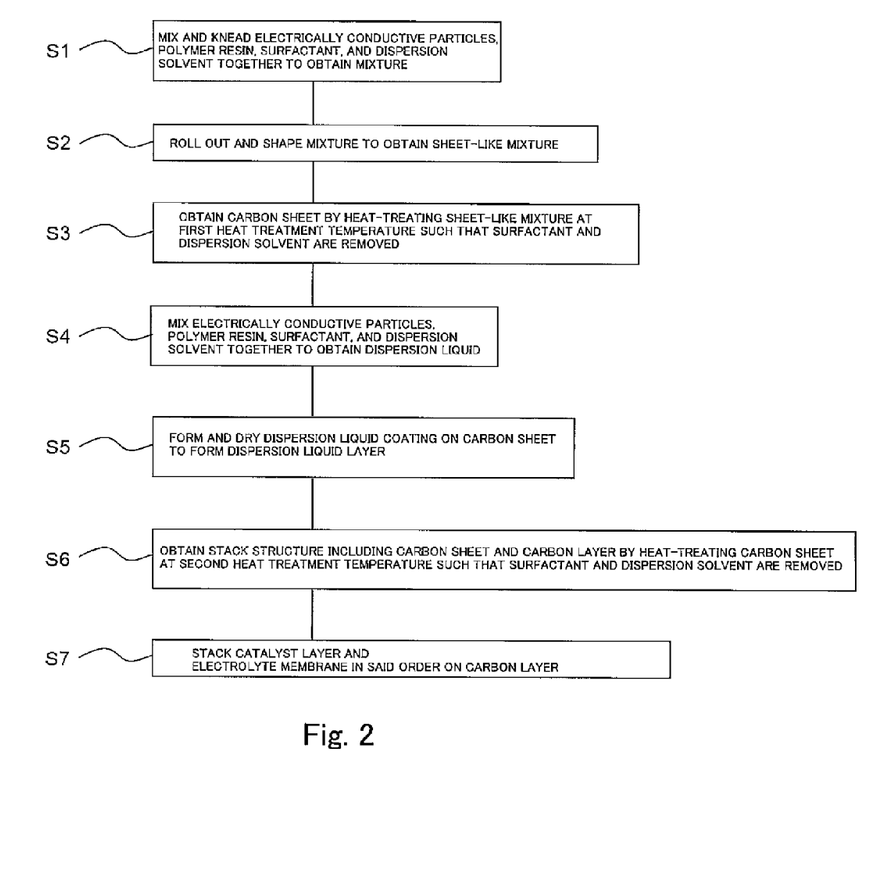
FIG. 2 is a flowchart showing an example of the membrane electrode assembly fabrication method according to Embodiment 1.

FIG. 2 is a flowchart showing an example of the membrane electrode assembly fabrication method according to Embodiment 1.

In the membrane electrode assembly fabrication method according to the present embodiment, first, electrically conductive particles, a polymer resin, a surfactant, and a dispersion solvent are mixed and kneaded to obtain a mixture (step S1).

For example, fine carbon powder can be used as the material of the electrically conductive particles serving as a raw material of the mixture. Examples of the fine carbon powder include carbon materials such as graphite, carbon black, activated carbon, and fine carbon fiber powder. Examples of the carbon black include acetylene black (AB), furnace black, KetjenBlack, and Vulcan. Examples of the fine carbon fiber powder include vapor-grown carbon fiber (VGCF), milled fiber, cut fiber, and chopped fiber. Any of these materials may be used alone as the electrically conductive particles, or some of these materials may be used in combination. The raw material of such a carbon material may be in any form such as powdery, fibrous, granular, etc. It is preferred to mix carbon black and carbon fiber together in terms of costs, electrical conductivity, and strength. Moreover, acetylene black is preferably used as the carbon black since the amount of impurities contained in acetylene black is small and acetylene black has high electrical conductivity.

Preferably, the amount of electrically conductive particles contained in the mixture is, for example, not less than 10 wt % and not more than 50 wt %.

For example, a fluorine resin can be used as the polymer resin serving as a raw material of the mixture. Examples of the fluorine resin include PTFE (polytetrafluoroethylene), FEP (tetrafluoroethylene/hexafluoropropylene copolymer), PVDF (polyvinylidene fluoride), ETFE (tetrafluoroethylene/ethylene copolymer), PCTFE (polychlorotrifluoroethylene), and PFA (tetrafluoroethylene/perfluoroalkyl vinyl ether copolymer). PTFE is suitably used as the polymer resin in terms of thermal resistance, water repellency, and chemical resistance. The raw material form of PTFE may be dispersion or powder, for example. It is preferred that the raw material form of PTFE is dispersion from the standpoint of workability. It should be noted that the polymer resin serves as a binder for binding the electrically conductive particles together. Since the polymer resin is water-repellent, the polymer resin also serves to retain water within the fuel cell system (i.e., water retentivity).

For example, the amount of polymer resin contained in the mixture is preferably not less than 1 wt % and not more than 20 wt %.

Examples of the dispersion solvent serving as a raw material of the mixture include water, alcohols such as methanol and ethanol, and glycols such as ethylene glycol. Among these, the use of water is preferred from economical and environmental standpoints.

For example, the amount of dispersion solvent contained in the mixture is preferably not less than 30 wt % and not more than 88 wt %.

Examples of the surfactant serving as a raw material of the mixture include anionic surfactants, cationic surfactants, zwitterionic surfactants, and non-ionic surfactants. Specific examples of the surfactant include non-ionic surfactants such as polyoxyethylene alkyl ethers and zwitterionic surfactants such as alkylamine oxides. The use of a non-ionic surfactant is preferred from the viewpoints of removal of the surfactant and prevention of catalyst poisoning caused by metal ions. Examples of the non-ionic surfactant include polyoxyethylene alkyl ethers, polyoxyethylene alkylphenyl ethers, alkylglycosides, polyoxyethylene fatty acid esters, sucrose fatty acid esters, sorbitan fatty acid esters, and fatty acid alkanolamides.

For example, the amount of surfactant contained in the mixture is preferably not less than 0.1 wt % and not more than 5 wt %.

The amount of dispersion solvent and the amount of surfactant used in the fabrication of the gas diffusion layer may be suitably set in accordance with, for example, the type of the electrically conductive particles, the type of the polymer resin, and the compounding ratio of these. Generally speaking, the more the amount of dispersion solvent and surfactant, the more easily the polymer resin (fluorocarbon resin) and the electrically conductive particles (carbon) are dispersed uniformly. However, such increase in the amount of dispersion solvent and surfactant results in tendencies for fluidity to increase and difficulty in forming a sheet to increase.

Other than the electrically conductive particles, the polymer resin, the surfactant, and the dispersion solvent, a different material (e.g., short carbon fibers) may be added to the mixture formed in step S1.

When step S1 is completed, the mixture is rolled out and shaped into a sheet-like mixture (step S2).

The sheet-like mixture refers to the mixture that has been rolled out and shaped into a sheet-like form. For example, a roll press machine or a flat press machine can be used for the rolling out and shaping process. The thickness of the sheet-like mixture may be suitably adjusted so that the thickness of a carbon sheet 115 obtained in step S3 described below will be a desired thickness value.

When step S2 is completed, the sheet-like mixture is heat-treated at a first heat treatment temperature, and thereby a carbon sheet 115, which is a result of removing the surfactant and the dispersion solvent from the sheet-like mixture through the heat treatment, is obtained (step S3).

The sheet-like mixture can be heat-treated in a baking furnace, an electric furnace, or a gas furnace, for example.

Preferably, the first heat treatment temperature, and the heating time of the heat treatment at the first heat treatment temperature, are set to such a temperature and a time as to cause the surfactant and the dispersion solvent to be sufficiently removed from the sheet-like mixture and to cause crystallization of the polymer resin to progress. The amount of residual surfactant and dispersion solvent can be measured based on, for example, results of analysis using TG/DTA (thermogravimetric/differential thermal analyzer) or the like. Generally speaking, it is desired that the amount of residual surfactant and dispersion solvent is 1 wt % or less of the total weight of the carbon sheet. Although the heat treatment temperature and heating time may be set so as to satisfy the desirable condition, the heat treatment temperature and heating time depend on the thickness of the carbon sheet 115.

Preferably, the thickness of the carbon sheet 115 is not less than 100 μm. If the thickness of the carbon sheet 115 is not less than 100 μm, the mechanical strength of the carbon sheet 115 is great.

Preferably, the thickness of the carbon sheet 115 is not more than 1000 μm. If the thickness of the carbon sheet 115 is not more than 1000 μm, the electrical resistance of the carbon sheet 115 is small.

Preferably, the first heat treatment temperature is not lower than 260 degrees Celsius. If the first heat treatment temperature is not lower than 260 degrees Celsius, then removal of the surfactant from the sheet-like mixture at such a speed as to realize mass productivity can be readily performed.

Preferably, the first heat treatment temperature is not higher than the melting point of the polymer resin serving as a raw material of the mixture. If the first heat treatment temperature is not higher than the melting point of the polymer resin serving as a raw material of the mixture, then the melting of the polymer resin is less likely to occur, and as a result, the structural strength is less likely to decrease and the sheet shape is less likely to be deformed.

In the case of using PTFE as the polymer resin, the melting point of the polymer resin is not lower than 330 degrees Celsius and not higher than 350 degrees Celsius. In this case, the first heat treatment temperature of the heat treatment is preferably not lower than 260 degrees Celsius and not higher than 330 degrees Celsius.

After step S3, or parallel to steps S1 to S3, electrically conductive particles, a polymer resin, a surfactant, and a dispersion solvent are mixed together to obtain a dispersion liquid (step S4).

More specifically, for example, a mixture of the surfactant and the dispersion solvent is subjected to dispersion treatment. Next, fine carbon powder and a fluorine resin are added to the mixture. Then, the mixture is further subjected to dispersion treatment. It should be noted that all the materials including the surfactant may be subjected to the dispersion treatment at the same time without performing the dispersion treatment of the surfactant in advance.

The material of the electrically conductive particles serving as a raw material of the dispersion liquid may be the same as the above-exemplified material of the electrically conductive particles serving as a raw material of the mixture in step S1. It should be noted that the material of the electrically conductive particles serving as a raw material of the mixture may be the same as, or different from, the material of the electrically conductive particles serving as a raw material of the dispersion liquid. For example, the amount of electrically conductive particles contained in the dispersion liquid is preferably not less than 1 wt % and not more than 30 wt %.

The material of the polymer resin serving as a raw material of the dispersion liquid may be the same as the above-exemplified material of the polymer resin serving as a raw material of the mixture in step S1. It should be noted that the material of the polymer resin serving as a raw material of the mixture may be the same as, or different from, the material of the polymer resin serving as a raw material of the dispersion liquid. For example, the amount of polymer resin contained in the dispersion liquid is preferably not less than 0.1 wt % and not more than 10 wt %. Preferably, the amount of polymer resin contained in the dispersion liquid is adjusted such that the polymer resin content in the carbon layer 116 which is obtained in step S6 is higher than the polymer resin content in the carbon sheet 115. The reason for this is that by increasing the polymer resin content in the carbon layer, the water repellency at the interface between the catalyst layer and the gas diffusion layer (carbon sheet) increases, which results in improved drainability of the MEA.

The material of the surfactant serving as a raw material of the dispersion liquid may be the same as the above-exemplified material of the surfactant serving as a raw material of the mixture in step S1. It should be noted that the material of the surfactant serving as a raw material of the mixture may be the same as, or different from, the material of the surfactant serving as a raw material of the dispersion liquid. For example, the amount of surfactant contained in the dispersion liquid is preferably not less than 0.1 wt % and not more than 5 wt %.

The material of the dispersion solvent serving as a raw material of the dispersion liquid may be the same as the above-exemplified material of the dispersion solvent serving as a raw material of the mixture in step S1. It should be noted that the material of the dispersion solvent serving as a raw material of the mixture may be the same as, or different from, the material of the dispersion solvent serving as a raw material of the dispersion liquid. For example, the amount of dispersion solvent contained in the dispersion liquid is preferably not less than 55 wt % and not more than 98 wt %.

After step S4, a coating of the dispersion liquid is formed on the carbon sheet 115, which is then dried and thereby a dispersion liquid layer thinner than the carbon sheet 115 is formed (step S5). For example, a spray coating machine or a screen printing machine can be used to form the coating of the dispersion liquid. A die coating method may be used as the coating method. It should be noted that it is preferred to use spray coating from the standpoint of suppressing the infiltration of the dispersion liquid into the carbon sheet 115. Examples of a method used for the drying include drying using a hot plate and drying using a drying oven.

After step S5, the carbon sheet 115 on which the dispersion liquid layer is formed is heat-treated at a second heat treatment temperature lower than the first heat treatment temperature, and thereby the surfactant and the dispersion solvent are removed from the dispersion liquid layer. As a result, the gas diffusion layer 114, in which the carbon layer 116 is formed on the carbon sheet 115, is obtained (step S6).

The carbon sheet 115 on which the dispersion liquid layer is formed can be heat-treated in an electric furnace, a gas furnace, or a far-infrared heating furnace, for example. Preferably, the heat treatment is performed in the air.

Preferably, for the heat treatment of the dispersion liquid, the material, thickness, heat treatment temperature, heating time, and the like are set so that, for example, the surfactant can be removed sufficiently and decrease in adhesiveness due to crystallization of the polymer resin will not be caused.

Preferably, the second heat treatment temperature, and the heating time of the heat treatment at the second heat treatment temperature, are set such that the second heat treatment temperature is lower than the first heat treatment temperature, and such that the second heat treatment temperature and the heating time cause the surfactant and the dispersion solvent to be sufficiently removed from the dispersion liquid layer while suppressing the crystallization of the polymer resin from progressing. The amount of residual surfactant and dispersion solvent can be measured based on, for example, results of analysis using TG/DTA (thermogravimetric/differential thermal analyzer) or the like. Generally speaking, it is desired that the amount of residual surfactant and dispersion solvent is 1 wt % or less of the total weight of the carbon layer. Although the heat treatment temperature and heating time may be set so as to satisfy the desirable condition, the heat treatment temperature and heating time depend on the thickness of the carbon layer.

Preferably, the thickness of the carbon layer 116 is not less than 10 μm. If the thickness of the carbon layer 116 is not less than 10 μm, then the adhesion strength of the carbon layer 116 can be secured.

Preferably, the thickness of the carbon layer 116 is not more than 100 μm. If the thickness of the carbon layer 116 is not more than 100 μm, then the surfactant can be removed at such a speed as to realize mass productivity even at a low heat treatment temperature.

Preferably, the second heat treatment temperature is not lower than the decomposition temperature of the surfactant serving as a raw material of the dispersion liquid. For example, the second heat treatment temperature is preferably not lower than 220 degrees Celsius. If the second heat treatment temperature is not lower than 220 degrees Celsius, the surfactant can be readily removed from the dispersion liquid layer at such a speed as to realize mass productivity.

More preferably, the second heat treatment temperature is not lower than 240 degrees Celsius. If the second heat treatment temperature is not lower than 240 degrees Celsius, the surfactant can be readily removed such that the amount of surfactant becomes 1 wt % or less in the carbon layer.

Preferably, the second heat treatment temperature is lower than 260 degrees Celsius. If the second heat treatment temperature is lower than 260 degrees Celsius, then decrease in the adhesiveness of the surface of the carbon layer is suppressed, and high adhesion of the surface to the catalyst layer can be obtained.

After step S6, the catalyst layer 113 and the polymer electrolyte membrane 111 are stacked in said order on the carbon layer 116 (step S7).

Specifically, for example, the gas diffusion layer 114 in which the carbon layer 116 is formed on the carbon sheet 115, and a stack structure (a catalyst coated membrane) which is a stack of the polymer electrolyte membrane 111 and the catalyst layer 113, are brought into contact with each other, such that the carbon layer 116 and the catalyst layer 113 come into contact with each other. Then, thermocompression bonding is performed at a third heat treatment temperature. The catalyst coated membrane is a structure in which an electrolyte membrane and a catalyst layer are joined together. The catalyst coated membrane is not limited to a particular type, and any common fuel cell catalyst coated membrane may be used.

Alternatively, the catalyst layer 113 may be placed on the carbon layer 116 first, and then the polymer electrolyte membrane 111 may be further placed thereon. Any method may be used so long as the method realizes a structure in which the catalyst layer 113 and the polymer electrolyte membrane 111 are stacked in said order on the gas diffusion layer 114.

Preferably, the third heat treatment temperature is set to such a temperature as to allow the gas diffusion layer, the catalyst layer, and the electrolyte membrane to be compression-bonded together with suitable strength. Specifically, for example, it is preferred that the third heat treatment temperature is lower than the second heat treatment temperature.

Preferably, the third heat treatment temperature is not lower than 100 degrees Celsius. If the third heat treatment temperature is not lower than 100 degrees Celsius, then the compression bonding can be suitably performed.

Preferably, the third heat treatment temperature is not higher than 200 degrees Celsius. If the third heat treatment temperature is not higher than 200 degrees Celsius, then alteration of the polymer electrolyte membrane 111 can be suitably suppressed.

It should be noted that step S7 may be eliminated from the above method, and such a method may be used as a gas diffusion layer fabrication method.

EXAMPLE 1

1. Fabrication of Carbon Sheet 50 g of acetylene black (DENKA BLACK available from Denki Kagaku Kogyo Kabushiki Kaisha), 80 g of graphite (available form Wako Pure Chemical Industries, Ltd.), 3 g of VGCF (available from Showa Denko K. K., having a fiber diameter of 0.15 µm and a fiber length of 15 µm), 4 g of a surfactant (Triton X), and 200 g of water were fed into a mixer, and mixed and kneaded. Next, 25 g of PTFE dispersion (AD 911 available from Asahi Glass Co., Ltd., solid content ratio 60 wt %) was fed into the mixer, and then further agitated for five minutes. As a result, a mixture was obtained.

Of the obtained mixture, 20 g was taken from the mixer and rolled out by using a stretching roller apparatus (with a gap of 600 µm) into a sheet-like mixture having a thickness of 600 µm. Thereafter, the sheet-like mixture was heat-treated in a baking furnace at 300° C. for two hours, and thereby the surfactant and water were removed from the mixture.

The sheet-like mixture from which the surfactant and water had been removed was taken from the baking furnace, and rolled out again by using a stretching roller apparatus (with a gap of 400 µm) to adjust the thickness and reduce the variation in the thickness. Thereafter, the sheet-like mixture was cut into a piece having a length and width of 6 cm. In this manner, a rubber-like carbon sheet having a thickness of 400 µm was fabricated.

2. Fabrication of Carbon Layer 151 g of water and 1 g of a surfactant (Triton X) were fed into a container, and dispersion treatment of the surfactant was performed by using a planetary mixer/deaerator. Next, 10 g of acetylene black (DENKA BLACK available from Denki Kagaku Kogyo Kabushiki Kaisha) and 5.5 g of PTFE dispersion (AD 911 available from Asahi Glass Co., Ltd., solid content ratio 60 wt %) were fed into the container, and then dispersion treatment of the acetylene black and PTFE was performed by using the planetary mixer/deaerator. Further, a filter (made of SUS, 200 mesh) was used to remove coarse particles, and then defoaming treatment was performed by using the planetary mixer/deaerator. As a result, a dispersion liquid was obtained.

The obtained dispersion liquid was applied, by spraying, onto one surface of a carbon sheet placed on a hot plate. The dispersion liquid was almost entirely dried out by drying using the hot plate (at 60 degrees Celsius), and thus a dispersion liquid layer was fabricated. To be more specific, the weight of the dispersion liquid layer after the drying was adjusted to be 2.0 mg/cm$^2$. Thereafter, the carbon sheet on which the dispersion liquid layer had been formed was heat-treated in a baking furnace at 240 degrees Celsius for 2 hours to remove the surfactant from the dispersion liquid layer. In this manner, a gas diffusion layer was fabricated.

EXAMPLE 2

A gas diffusion layer was fabricated by using the same method as in Example 1, except that the carbon sheet on which the dispersion liquid layer had been formed was heat-treated in a baking furnace at 220 degrees Celsius.

EXAMPLE 3

A gas diffusion layer was fabricated by using the same method as in Example 1, except that the carbon sheet on which the dispersion liquid layer had been formed was heat-treated in a baking furnace at 260 degrees Celsius.

COMPARATIVE EXAMPLE 1

A gas diffusion layer was fabricated by using the same method as in Example 1, except that the carbon sheet on which the dispersion liquid layer had been formed was heat-treated in a baking furnace at 280 degrees Celsius.

COMPARATIVE EXAMPLE 2

A gas diffusion layer was fabricated by using the same method as in Example 1, except that the carbon sheet on which the dispersion liquid layer had been formed was heat-treated in a baking furnace at 300 degrees Celsius.

EXPERIMENT EXAMPLE 1

Adhesion Strength Test

In Experiment Example 1, adhesion strength was measured between a catalyst layer and each of the gas diffusion layers fabricated in Examples 1 to 3 and Comparative Examples 1 and 2.

A catalyst layer forming ink (catalyst: 10E50E available from Tanaka Kikinzoku Kogyo K. K., electrolyte resin: Flemion solution available from Asahi Glass Co., Ltd.) was applied onto one surface of a polymer electrolyte membrane (GORE-SELECT available from Japan Gore-Tex Inc.), and then dried to form a catalyst layer. The catalyst layer thus obtained was brought into contact with the carbon layer of each gas diffusion layer. Then, hot pressing was performed for one minute at 180 degrees Celsius with 6 kgf/cm$^2$, and thereby the catalyst layer and the gas diffusion layer were joined together. The joined layers were cut into a test piece in a size of 25 mm×100 mm, and subjected to a 90-degree peel test by using a compact bench-top tester (EZ-Graph available from Shimadzu Corporation).

Figure 3:
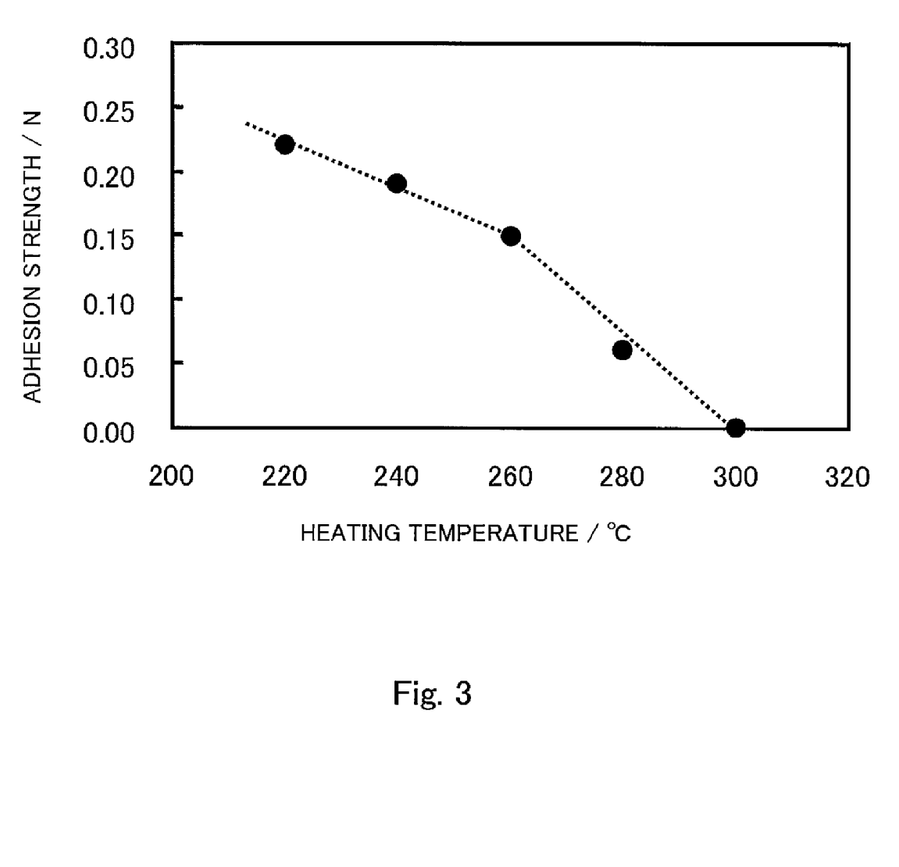
FIG. 3 shows results of Experiment Example 1.

FIG. 3 shows results of Experiment Example 1. As shown in FIG. 3, the higher the temperature of the heat treatment (second heat treatment temperature) performed on the carbon sheet having the dispersion liquid layer formed thereon, the more the adhesion strength tends to decrease. Thus, it has been found preferable that the temperature of the heat treatment performed on the carbon sheet having the dispersion liquid layer formed thereon is set to be low from the standpoint of securing the strength of the adhesion to the catalyst layer.

It has been found that the adhesion strength decreases significantly particularly in a region where the heat treatment temperature exceeds 260 degrees Celsius. The reason for this is considered that the crystallization of the polymer resin (PTFE) is facilitated at 260 degrees Celsius or higher. Therefore, from the standpoint of securing the strength of the adhesion to the catalyst layer, it is considered preferable that the second heat treatment temperature is set to be lower than 260 degrees Celsius.

EXPERIMENT EXAMPLE 2

Measurement of Residual Amount of Surfactant

In Experiment Example 2, a relationship between the second heat treatment temperature and a residual amount of surfactant in the carbon layer was reviewed.

A coating of the dispersion liquid described in Example 1 was formed in the same manner as in Example 1, but on aluminum foils, and then dried by using a hot plate in the same manner as in Example 1. The obtained aluminum foils, each of which has a carbon layer formed thereon, were used as samples as follows: the aluminum foil as it was (Sample A); the aluminum foil that was heat-treated in a baking furnace at 220 degrees Celsius for 2 hours (Sample B); the aluminum foil that was heat-treated in a baking furnace at 240 degrees Celsius for 2 hours (Sample C); and the aluminum foil that was heat-treated in a baking furnace at 280 degrees Celsius for 2 hours (Sample D).

For each sample, the carbon layer was peeled off from the aluminum foil, and a residual amount of surfactant in the carbon layer was measured by using TG/DTA (thermogravimetric/differential thermal analyzer: TGDTA 6300 available from Seiko Instruments Inc.). By using TG/DTA, in an air atmosphere, the temperature was increased from a room temperature to 400 degrees Celsius at a rate of 10° C./min, and a weight change rate (weight after temperature increase/weight before temperature increase×100) was measured.

Figure 4:
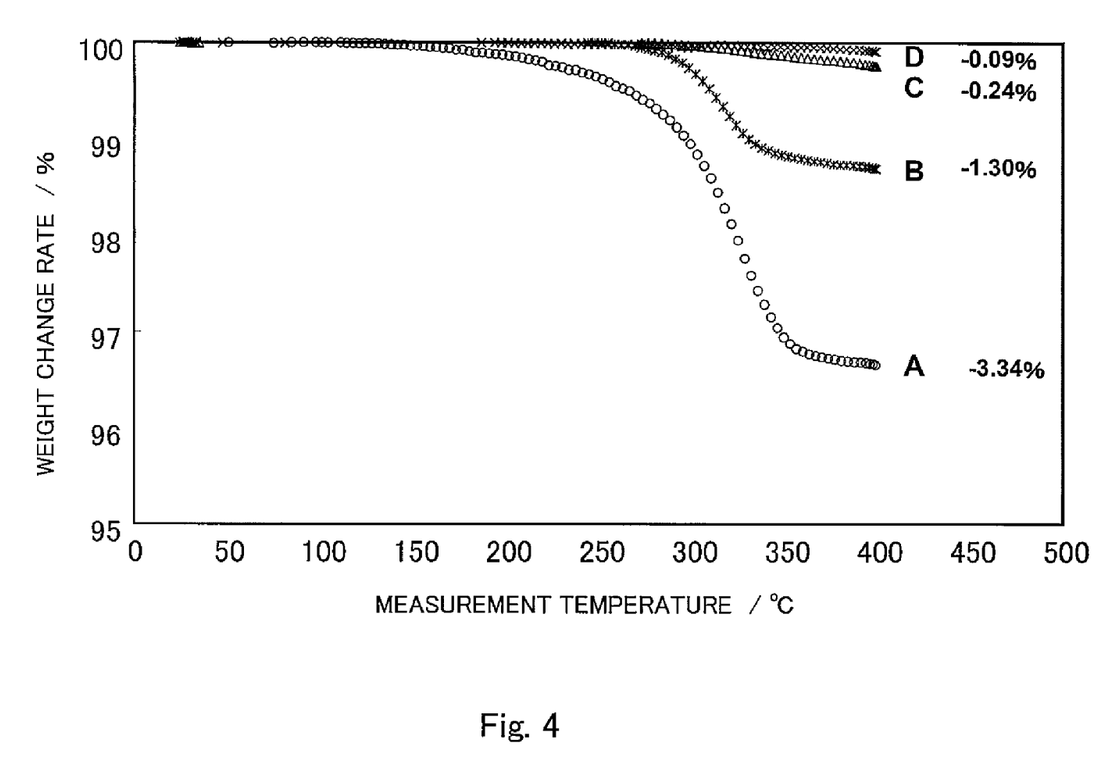
FIG. 4 shows results of Experiment Example 2.

FIG. 4 shows results of Experiment Example 2. As shown in FIG. 4, the weight of the unheat-treated carbon layer (Sample A) started to decrease around 150° C., and the degree of the weight decrease became significantly small around 350° C. The weight change is mainly caused when the surfactant that remains in the carbon layer is decomposed and lost. It has been found that the thermal decomposition of the surfactant in the carbon layer occurs mainly in a temperature range from 150° C. to 350° C.

Looking at the weight change rates of the respective samples after being heated to 400° C., it was confirmed that the higher the heat treatment temperature, the lower the weight change rate (Sample D [=−0.09%]<Sample C [=−0.24%]<Sample B [=−1.30%]<Sample A [=−3.34%]). This indicates that the higher the heat treatment temperature, the less the residual amount of surfactant. Generally speaking, the residual amount of surfactant is desirably 1 wt % or less of the total weight of the carbon layer. That is, the second heat treatment temperature is preferably set to 220° C. or higher, and more preferably, 240° C. or higher.

As one example, the membrane electrode assembly obtained from the fabrication method according to the present embodiment includes: a carbon sheet containing electrically conductive particles, a polymer resin, and a surfactant; a carbon layer provided on the carbon sheet and containing electrically conductive particles, a polymer resin, and a surfactant, such that a polymer resin content is higher in the carbon layer than in the carbon sheet; a catalyst layer provided to be in contact with the carbon layer; and an electrolyte membrane provided on the catalyst layer. In the membrane electrode assembly, a residual amount of surfactant in the carbon layer is 1 wt % or less, and an adhesion strength between the carbon layer and the catalyst layer is 0.1 N or greater per 25 mm×100 mm. Moreover, in the membrane electrode assembly obtained from the fabrication method according to the present embodiment, it is not necessary for the carbon layer and the catalyst layer to be bonded to each other via an adhesive.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The fabrication method according to the present invention is useful as a method of fabricating a membrane electrode assembly that is easy to handle, and fabricating a gas diffusion layer for obtaining the membrane electrode assembly.

REFERENCE SIGNS LIST 100 cell
110 MEA
111 polymer electrolyte membrane
112 electrode layer
113 catalyst layer
114 gas diffusion layer
115 carbon sheet
116 carbon layer
117 gasket
120 separator
121 fuel gas channel grooves
122 oxidizing gas channel grooves
123 cooling water channel grooves
130 fastening member

The invention claimed is:

1. A method of fabricating a membrane electrode assembly, the method comprising:
    obtaining a mixture by mixing first electrically conductive particles, a first polymer resin, a first surfactant, and a first dispersion solvent;
    obtaining a sheet-like mixture by shaping the mixture;
    obtaining a carbon sheet by heat-treating the sheet-like mixture at a first heat treatment temperature;
    obtaining a dispersion liquid by mixing second electrically conductive particles, a second polymer resin, a second surfactant, and a second dispersion solvent;
    forming, on the carbon sheet, a dispersion liquid layer thinner than the carbon sheet by forming and drying a coating of the dispersion liquid on the carbon sheet;
    obtaining a gas diffusion layer in which a carbon layer is formed on the carbon sheet, by heat-treating the carbon sheet on which the dispersion liquid layer is formed at a second heat treatment temperature lower than the first heat treatment temperature, the second heat treatment temperature being lower than 260 degrees Celsius; and
    stacking a catalyst layer and an electrolyte membrane in said order on the carbon layer.

2. The method of fabricating a membrane electrode assembly according to claim 1, wherein the dispersion liquid layer is formed by spray coating.

3. The method of fabricating a membrane electrode assembly according to claim 1, comprising:
    bringing a stack structure, which is a stack of the electrolyte membrane and the catalyst layer, into contact with the gas diffusion layer such that the carbon layer and the catalyst layer come into contact with each other; and
    performing thermocompression bonding at a third heat ent temperature lower than the second heat treatment temperature.

4. The method of fabricating a membrane electrode assembly according to claim 1, wherein
    the second surfactant is a non-ionic surfactant.

5. The method of fabricating a membrane electrode assembly according to claim 2, wherein
    the heat treatment at the second heat treatment temperature is performed in air.

6. The method of fabricating a membrane electrode assembly according to claim 1, wherein
    the carbon layer has a thickness of not less than 10 μm and not more than 100 μm, and
    the second heat treatment temperature is not lower than a decomposition temperature of the second surfactant.

7. The method of fabricating a membrane electrode assembly according to claim 1, wherein
the carbon sheet has a thickness of not less than 100 μm and not more than 1000 μm, and
the first heat treatment temperature is not lower than 260 degrees Celsius and not higher than a melting point of the polymer resin that serves as a raw material of the mixture.

8. The method of fabricating a membrane electrode assembly according to claim 1, wherein a polymer resin content in the carbon layer is higher than a polymer resin content in the carbon sheet.

9. A method of fabricating a gas diffusion layer, the method comprising:
obtaining a mixture by mixing first electrically conductive particles, a first polymer resin, a first surfactant, and a first dispersion solvent;
obtaining a sheet-like mixture by shaping the mixture;
obtaining a carbon sheet by heat-treating the sheet-like mixture at a first heat treatment temperature;
obtaining a dispersion liquid by mixing second electrically conductive particles, a second polymer resin, a second surfactant, and a second dispersion solvent;
forming, on the carbon sheet, a dispersion liquid layer thinner than the carbon sheet by forming and drying a coating of the dispersion liquid on the carbon sheet; and
obtaining a gas diffusion layer in which a carbon layer is formed on the carbon sheet, by heat-treating the carbon sheet on which the dispersion liquid layer is formed at a second heat treatment temperature lower than the first heat treatment temperature, the second heat treatment temperature being lower than 260 degrees Celsius.

10. The method of fabricating a membrane electrode assembly according to claim 1, wherein the second heat treatment temperature is not lower than 220 degrees Celsius.

11. The method of fabricating a membrane electrode assembly according to claim 1, wherein the second heat treatment temperature is not lower than 240 degrees Celsius.

12. The method of fabricating a membrane electrode assembly according to claim 1, wherein an amount of the first electrically conductive particles contained in the mixture is not less than 10 wt % and not more than 50 wt %.

13. The method of fabricating a membrane electrode assembly according to claim 1, wherein an amount of the second electrically conductive particles contained in the dispersion liquid is not less than 1 wt % and not more than 30 wt %.

14. The method of fabricating a membrane electrode assembly according to claim 1, wherein an amount of the first polymer resin contained in the mixture is not less than 1 wt % and not more than 20 wt %.

15. The method of fabricating a membrane electrode assembly according to claim 1, wherein an amount of the second polymer resin contained in the dispersion liquid is not less than 0.1 wt % and not more than 10 wt %.

16. The method of fabricating a membrane electrode assembly according to claim 1, wherein an amount of the first surfactant contained in the mixture is not less than 0.1 wt % and not more than 5 wt %.

17. The method of fabricating a membrane electrode assembly according to claim 1, wherein an amount of the second surfactant contained in the dispersion liquid is not less than 0.1 wt % and not more than 5 wt %.

18. The method of fabricating a membrane electrode assembly according to claim 1, wherein an amount of the first dispersion solvent contained in the mixture is not less than 30 wt % and not more than 88 wt %.

19. The method of fabricating a membrane electrode assembly according to claim 1, wherein an amount of the second dispersion solvent contained in the dispersion liquid is not less than 55 wt % and not more than 98 wt %.

* * * * *